(12) United States Patent
Le et al.

(10) Patent No.: US 7,558,016 B1
(45) Date of Patent: Jul. 7, 2009

(54) DISK DRIVE SERVO CONTROL TECHNIQUES FOR PREDICTING AN OFF-TRACK CONDITION UTILIZING AN ESTIMATION FILTER

(75) Inventors: Tien Quang Le, Tustin, CA (US); Duc T. Phan, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 77 days.

(21) Appl. No.: 11/788,641

(22) Filed: Apr. 20, 2007

(51) Int. Cl.
*G11B 21/02* (2006.01)
(52) U.S. Cl. .................................................... 360/75
(58) Field of Classification Search ................ 360/75, 360/77.08, 78.05, 73.03, 78.07, 78.09, 78.04, 360/31, 78.06; 318/569; 702/141
See application file for complete search history.

(56) References Cited

U.S. PATENT DOCUMENTS

| | | | |
|---|---|---|---|
| 4,679,103 A | 7/1987 | Workman | |
| 4,914,644 A | 4/1990 | Chen et al. | |
| 5,333,138 A | 7/1994 | Richards et al. | |
| 5,570,244 A | 10/1996 | Wiselogel | |
| 5,696,645 A | 12/1997 | Laughlin | |
| 5,898,286 A * | 4/1999 | Clare et al. ................. | 318/569 |
| 5,914,830 A | 6/1999 | Kadlec et al. | |
| 6,046,877 A | 4/2000 | Kelsic | |
| 6,115,200 A | 9/2000 | Allen et al. | |
| 6,178,054 B1 | 1/2001 | Wakefield | |
| 6,178,058 B1 | 1/2001 | Pan et al. | |
| 6,249,393 B1 | 6/2001 | Billings et al. | |
| 6,282,046 B1 * | 8/2001 | Houston et al. ........... | 360/73.03 |
| 6,313,964 B1 | 11/2001 | Lamberts et al. | |
| 6,564,110 B1 | 5/2003 | Makino et al. | |
| 6,717,757 B1 | 4/2004 | Levy et al. | |
| 6,847,503 B2 | 1/2005 | Zhang et al. | |
| 6,873,489 B2 * | 3/2005 | Ho et al. ................... | 360/78.05 |
| 6,882,489 B1 | 4/2005 | Brunnett et al. | |
| 6,903,896 B2 * | 6/2005 | Miyata et al. ............. | 360/78.06 |
| 6,927,929 B2 * | 8/2005 | Gong et al. ................ | 360/31 |
| 6,937,428 B2 * | 8/2005 | Ho et al. ................... | 360/78.06 |
| 6,940,679 B1 | 9/2005 | McNeil et al. | |
| 6,940,685 B2 | 9/2005 | Chrappan Soldavini et al. | |
| 6,950,271 B2 * | 9/2005 | Inaji et al. ................. | 360/78.04 |
| 6,958,881 B1 * | 10/2005 | Codilian et al. ........... | 360/77.08 |
| 6,975,468 B1 | 12/2005 | Melrose et al. | |
| 6,995,944 B1 * | 2/2006 | Takaishi et al. ........... | 360/78.06 |
| 7,136,256 B2 * | 11/2006 | Takaishi et al. ........... | 360/78.04 |
| 7,143,002 B2 * | 11/2006 | Hirano ...................... | 702/141 |
| 7,276,874 B2 * | 10/2007 | Aoki et al. ................. | 318/560 |
| 2004/0246619 A1 | 12/2004 | Zhang | |
| 2006/0114601 A1 * | 6/2006 | Semba et al. ............. | 360/78.09 |
| 2007/0211372 A1 * | 9/2007 | Takaishi ................... | 360/78.07 |

* cited by examiner

*Primary Examiner*—Fred Tzeng
(74) *Attorney, Agent, or Firm*—Blakely, Sokoloff, Taylor & Zafman

(57) ABSTRACT

A disk drive comprising a moveable head, a disk, and a servo controller to control track following operations including implementing an estimation filter is disclosed. The disk includes a plurality of tracks in which a substantial majority of the tracks include a plurality of servo sectors utilized in track following operations. The servo controller implements an estimation filter and performs operations that include: determining a current position estimate of the moveable head relative to the track; predicting a subsequent position estimate of the moveable head relative to the track based upon the current position estimate; and determining whether the predicted subsequent position exceeds an error threshold.

18 Claims, 6 Drawing Sheets

$$\begin{bmatrix} \text{Pos\_est}(k+1) \\ \text{Vel\_est}(k+1) \\ \text{Bias\_est}(k+1) \end{bmatrix} = \begin{bmatrix} A_{11} & A_{12} & B_{15} \\ A_{21} & A_{22} & B_{25} \\ A_{31} & A_{32} & B_{35} \end{bmatrix} * \begin{bmatrix} \text{Pos\_est}(k) \\ \text{Vel\_est}(k) \\ \text{Pos\_M}(k) \end{bmatrix} + \begin{bmatrix} A_{13} & B_{11} & B_{12} & B_{13} & B_{14} \\ A_{23} & B_{21} & B_{22} & B_{23} & B_{24} \\ A_{33} & 0 & 0 & 0 & 0 \end{bmatrix} * \begin{bmatrix} \text{Bias\_est}(k) \\ \text{Notch1}(k) \\ \text{Notch2}(k) \\ \text{Notch3}(k) \\ \text{Notch4}(k) \end{bmatrix}$$

FIG. 6

DISK DRIVE SERVO CONTROL TECHNIQUES FOR PREDICTING AN OFF-TRACK CONDITION UTILIZING AN ESTIMATION FILTER

BACKGROUND OF THE INVENTION

1. Field of the Invention

The present invention relates to disk drives. More particularly, the present invention relates to disk drive servo control techniques for predicting an off-track condition utilizing an estimation filter during track following operations.

2. Description of the Related Art

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

Each servo sector typically includes at least a track identification (TKID) field, a sector ID field having a sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input.

Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain the binary encoded sector ID number that identifies each sector of the track. In this way, the servo control system continuously knows where the moveable transducer head is relative to the disk.

Further, position error signals (PESs) are often utilized as a feedback signal for the servo control system during track following operations. The PES signal may be derived from read servo bursts as the head flies over the servo bursts of the servo sectors of the disk. The PES signal may be utilized by the servo control system to keep the head near the center of the track.

As disk drive manufacturers have been forced to increase data capacity in disk drives to remain competitive, a greater number of tracks are now provided on each disk for data storage. In order to accomplish this, the widths of the tracks have become increasingly smaller as well as the distance between each of the tracks.

Consequently, servo control margins for track following have likewise become increasingly smaller. Unfortunately, during track following, due to smaller track widths and less distance between tracks, off-track conditions in which it is unsafe to write occur more often and have become more problematic.

SUMMARY OF THE INVENTION

In one embodiment of the present invention, a disk drive comprising a moveable head, a disk, and a servo controller to control track following operations including implementing an estimation filter is disclosed. The disk includes a plurality of tracks in which a substantial majority of the tracks include a plurality of servo sectors utilized in track following operations. The servo controller implements an estimation filter and performs operations that include: determining a current position estimate of the moveable head relative to the track; predicting a subsequent position estimate of the moveable head relative to the track based upon the current position estimate; and determining whether the predicted subsequent position exceeds an error threshold.

In another embodiment of the present invention, a method for performing track following operations in a disk drive is disclosed. The method comprises moving a head relative to a disk having a plurality of tracks in which a substantial majority of the tracks have a plurality of servo sectors utilized in track following operations. The method further comprises controlling track following operations with the moveable head and implementing an estimation filter to: determine a current position estimate of the moveable head relative to the track; predict a subsequent position estimate of the moveable head relative to the track based upon the current position estimate; and determine whether the predicted subsequent position exceeds a threshold.

In even a further embodiment of the present invention, a disk drive comprising a moveable head, a disk having a plurality of tracks in which a substantial majority of the tracks include a plurality of servo sectors utilized in track following operations, and a means for controlling track following operations with a moveable head is disclosed. The disk drive further comprises: means for determining a current position estimate of the moveable head relative to a track; means for predicting a subsequent position estimate of the moveable head relative to the track based upon the current position estimate; and means for determining whether the predicted subsequent position exceeds an error threshold.

The foregoing and other features of the invention are described in detail below and are set forth in the appended claims.

BRIEF DESCRIPTION OF THE DRAWINGS

FIG. 6 is a diagram illustrating one example of a type of estimation filter (e.g. a Kalman filter) that may be utilized with embodiments of the invention.

DETAILED DESCRIPTION

Figure 1:
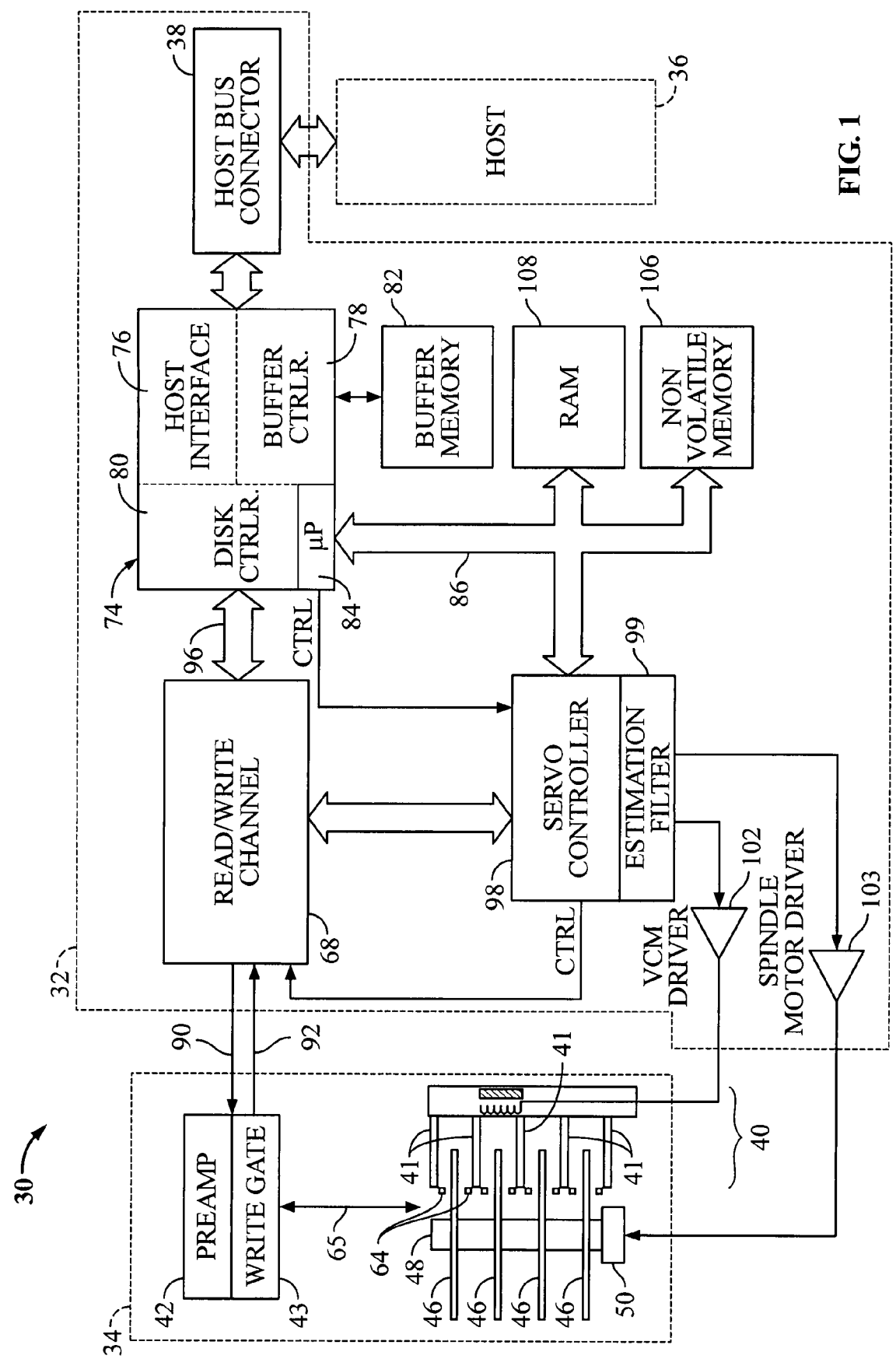
FIG. 1 shows a simplified block diagram of a disk drive, in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device 36 such as a desktop computer, a laptop computer, server computer, a mobile computing device (e.g. PDA, camera, cell-phone, etc.), or any type of computing device. Disk drive 30 may be of a suitable form factor and capacity for larger computers or for smaller mobile devices (e.g. a small form factor (SFF) disk drive).

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90. Preamplifier 42 further includes a write gate 43 to control the ability of heads 64 to write to disks 46, respectively, wherein the write gate 43 may be toggled on and off to allow and inhibit writing by heads 64, respectively, responsive to write enable and write disable commands transferred through read/write channel 68 (to be discussed in more detail later).

Controller PCBA 32 comprises read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Servo controller 98 may operate under the control of a program or routine including the implementation of an estimation filter 99 to execute methods or processes in accordance with embodiments of the invention, as will be described in more detail later. These embodiments relate to servo control techniques for predicting an off-track condition utilizing estimation filter 99 during track following operations. Microprocessor 84 may pre-program servo controller 98 and/or initialize the servo controller with initial and operational values for use in implementing these servo control techniques including the implementation of estimation filter 99 and may aid servo controller 98 in performing this functionality. Alternatively, microprocessor 84 may implement the servo control techniques.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc. Similarly, servo controller 98 need not be limited to servo control functions but may also provide other functionality such as management of the read/write channel as well other disk drive control functions.

Host initiated operations for reading and writing data in disk drive 30 are executed under control of microprocessor 84 of HIDC 74 which is connected to the controllers and memory arrays via bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 includes disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo sectors (termed "servo sectors") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98, to provide position information to microprocessor 84 via bus 86. Further, servo controller 98 may operate under the control of a program or routine to implement an estimation filter to execute methods or processes in accordance with embodiments of the invention related to predicting an off-track condition during track following operations, as will be described hereinafter.

Figure 2:
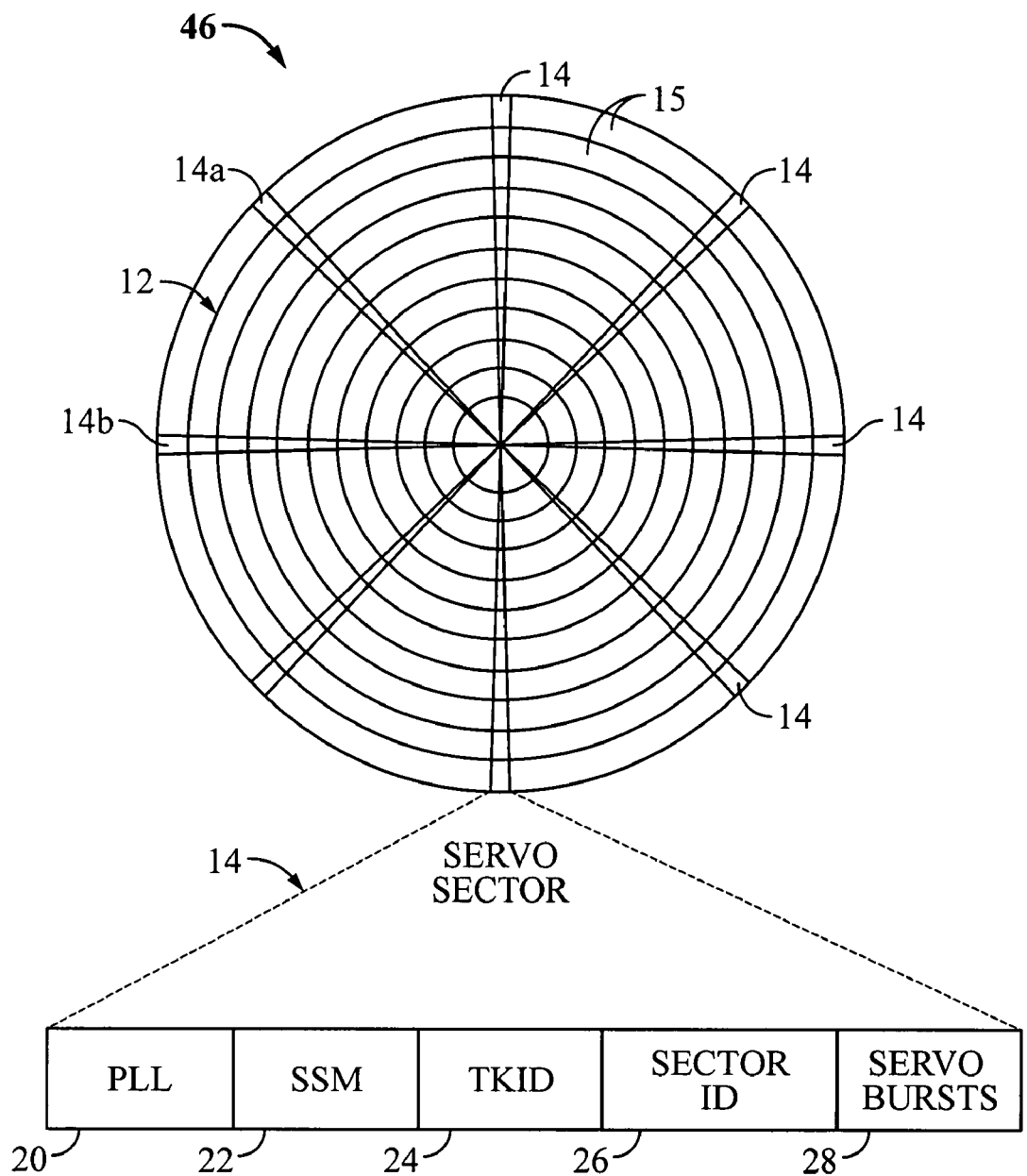
FIG. 2 is a diagram showing a disk of the disk drive of FIG. 1 having a plurality of concentric tracks, and more particularly, illustrates components of a servo sector.

FIG. 2 shows a disk 46 of the disk drive 30 of FIG. 1 having a plurality of concentric tracks, and more particularly, illustrates components of a servo sector 14. Disk 46 includes a plurality of concentric circumferential tracks 12. Each circumferential track 12 includes a plurality of embedded servo sectors 14 utilized in seeking and track following. The plurality of servo sectors 14 are spaced sequentially around a circumference of the circumferential track 12. For example, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 includes phase lock loop (PLL) field 20, a servo synch mark (SSM) field 22, a track identification (TKID) field 24, a sector identifier (ID) 26, and a group of servo bursts 28, such as an alternating pattern of magnetic transitions, that the servo control system samples to align the moveable transducer head with, and relative to, a particular track. Typically, servo controller 98 moves the transducer head 64 toward a desired track during a "seek" mode using the TKID field 24 as a control input.

In processing information, to ensure consistency in the detection of bits composing a block of bits, the phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM. The sector ID 26 is a binary encoded sector ID number to identify the sector.

Further, once the transducer head 64 is generally over a desired track 12, the servo controller 98 uses the servo bursts 28 to keep the transducer head 64 over the track in a "track follow" mode based upon demodulated PES values from the read servo bursts. During track following mode, the moveable transducer head 64 repeatedly reads the sector ID 26 of each successive servo sector to obtain the binary encoded sector ID number that identifies each sector of the track.

Based on the TKID and sector ID, the servo controller 98 continuously knows where the head 64 is relative to the disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

Figure 3:
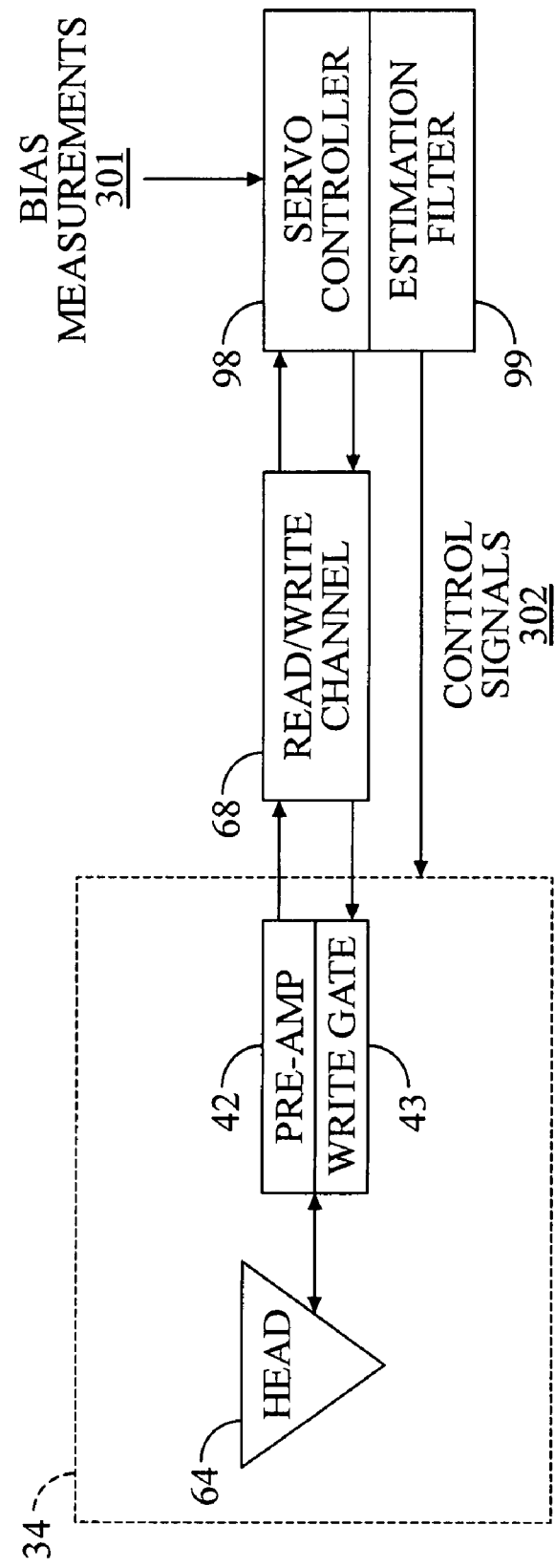
FIG. 3 shows a simplified block diagram of some of the components of the disk drive of FIG. 1, which are relevant to the description of the implementation of a servo control system, according to one embodiment of the present invention.

FIG. 3 illustrates a simplified example of some of the components of the previously-described disk drive 30 that are relevant to the description of the implementation of servo controller 98. As previously described, servo controller 98 samples servo sectors at regular intervals to provide servo position information. Servo sectors are read by head 64, amplified by pre-amplifier 42, received by read/write channel 68, and are processed by servo controller 98. Servo controller 98 controls the position of the actuator assembly of the HDA 34 via control signals 302 through the VCM driver (as previously described).

Servo controller 98 may operate under the control of a program or routine—including the implementation of estimation filter 99—to execute methods or processes relating to servo control techniques for predicting an off-track condition during track following operations. As previously described, servo controller 98 is generally responsible for commanding seeking and track following operations via the actuator assembly of the HDA 34. In particular, in one embodiment, when servo controller 98 determines that an off-track condition has occurred based on results from estimation filter 99, write operations by head 64 are inhibited by write gate 43 being toggled off.

It should be noted that estimation filter 99 takes into account various bias measurements 301 characterizing bias forces that the disk drive is subjected to such as windage, thermal effects, etc., to generate estimated bias values that are utilized by estimation filter 99 for predicting off-track conditions during track following operations, as will be described hereinafter.

In one embodiment, servo controller 98 controls track following by moveable head 64 by implementing estimation filter 99 to aid in performing operations comprising: determining a current position estimate of the moveable head relative to a track, predicting a subsequent position estimate of the moveable head relative to the track based upon the current position estimate, and determining whether the predicted subsequent position exceeds an error threshold. If it is determined that the error threshold has been exceeded, write operations by head 64 are inhibited by write gate 43 being toggled off.

In one embodiment, the estimation filter 99 may be a Kalman filter that includes state modeling coefficients to model a relationship of the head relative to the track and control modeling coefficients to model a control relationship of the head relative to the track. Also, in some embodiments, bias modeling coefficients may be utilized to model a relationship of the head relative to the track in view of bias forces associated with the disk drive such as windage, vibration, and thermal effects.

Is should be appreciated that embodiments of the invention may be implemented with servo controller and/or other circuitry, including microprocessor 84. Particularly, circuitry of the disk drive, including but not limited to servo controller 98 and/or microprocessor 84, may operate under the control of a program or routine to execute methods or processes in accordance with embodiments of the invention related to servo control techniques including implementing an estimation filter to predict an off-track condition during track following. For example, such a program may be implemented in firmware or software (e.g. stored in non-volatile memory 106 or other locations) and may be implemented by processors such as: servo controller 98, microprocessor 84, and/or other circuitry.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor circuitry to perform the operations described herein. The term "data" herein refers to any type of information that is encoded for machine-readable purposes. Therefore, it may include programs, code, data, files, etc.

Figure 4:
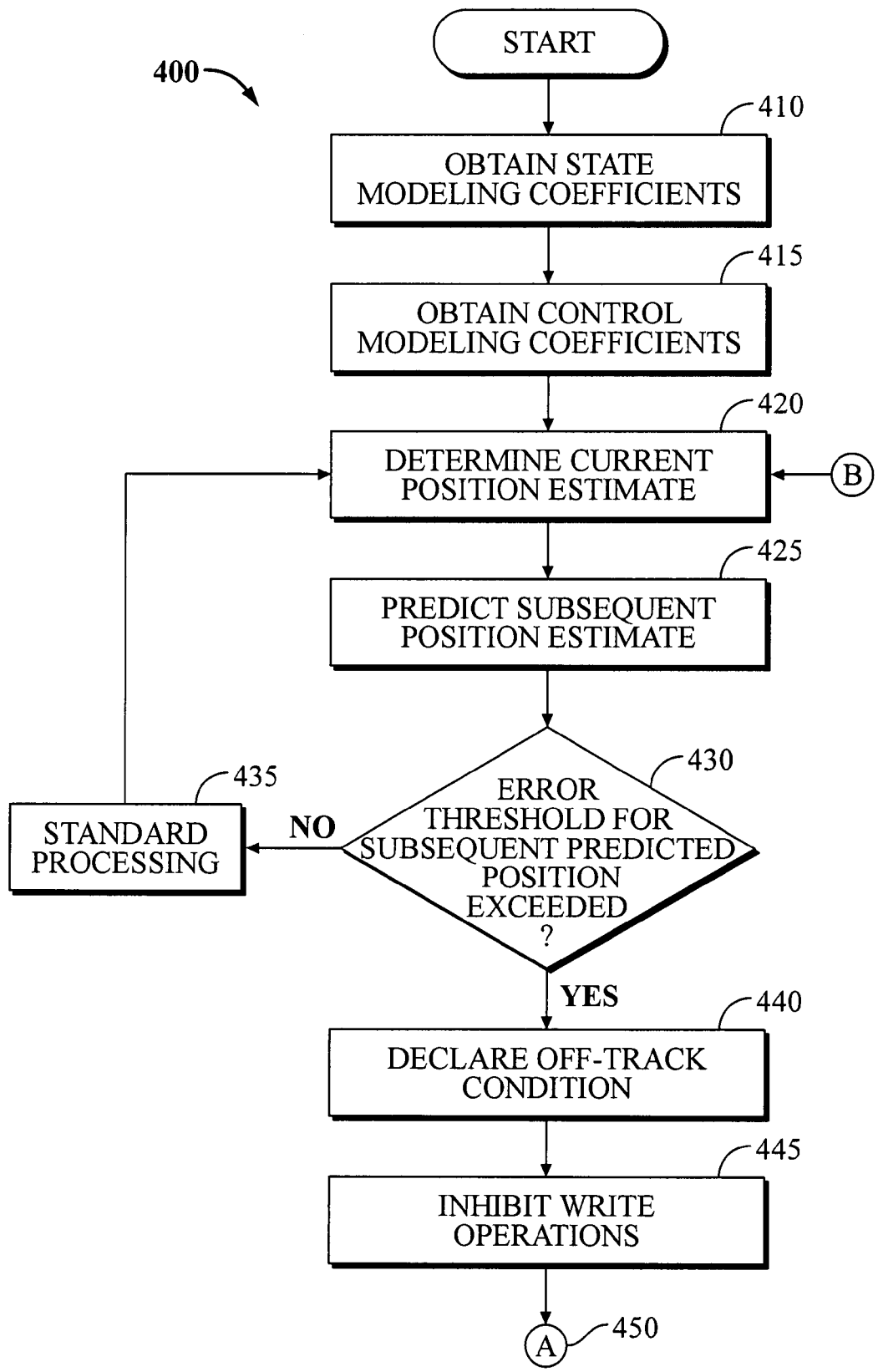
FIG. 4 is a flow diagram illustrating a process of utilizing an estimation filter during track following operations to aid in predicting an off-track condition, according to one embodiment of the present invention.

FIG. 4 is a flow diagram illustrating a process 400 of utilizing an estimation filter during track following operations to aid in predicting an off-track condition.

As shown in process 400, at block 410 state modeling coefficients are obtained for use with the estimation filter. State modeling coefficients correspond to pre-determined values that have been found to characterize the relationship of the state of the moveable head relative to the track. Next, at block 415, control modeling coefficients are obtained for use by the estimation filter. Control modeling coefficients correspond to pre-determined values that have been found to characterize the control relationship of the moveable head relative to the track. It should be appreciated that these state and control modeling coefficients may be pre-programmed for use at the start-up of the disk drive. Further, these state and control modeling coefficients may be determined for the individual disk drive or for a particular product class or type of disk drive. Additionally, in some embodiments, the state and control modeling coefficients may be continually updated by the disk drive to provide an optimized estimation filter.

Additionally, it should be noted that in one embodiment the estimation filter may include a Kalman filter. However, it should be appreciated that many different types of filters that estimate the state of a dynamic system from a series of measurements may be utilized. In particular, filters that estimate values from incomplete and/or noisy measurements are particularly useful. Thus, although a Kalman filter will be particularly described hereinafter, it should be appreciated that a wide variety of estimation filters may be utilized. These types of filters include linear filters, information filters, digital filters, impulse response (IIR) filters, non-linear filters, etc.

At block 420 the estimation filter determines a current position estimate and at block 425 predicts a subsequent position estimate.

If at decision block 430, it is determined that an error threshold for the subsequent predicted position estimate is exceeded, then at block 440 an off-track condition is declared and write operations are inhibited at block 445. As previously described, write operations may be inhibited by the write gate being toggled off to inhibit write operations. The process then moves to circle A 450.

On the other hand, if the error threshold for the subsequent predicted position is not exceeded, then standard processing continues (block 435). During standard processing, read/write operations continue as well as the track following methodology including the above-described process of determining current position estimates, predicting subsequent position estimates, and determining whether an error threshold for the subsequent predicted position has been exceeded. This track following methodology iteratively continues to ensure that head remains on-track during track following.

Figure 5:
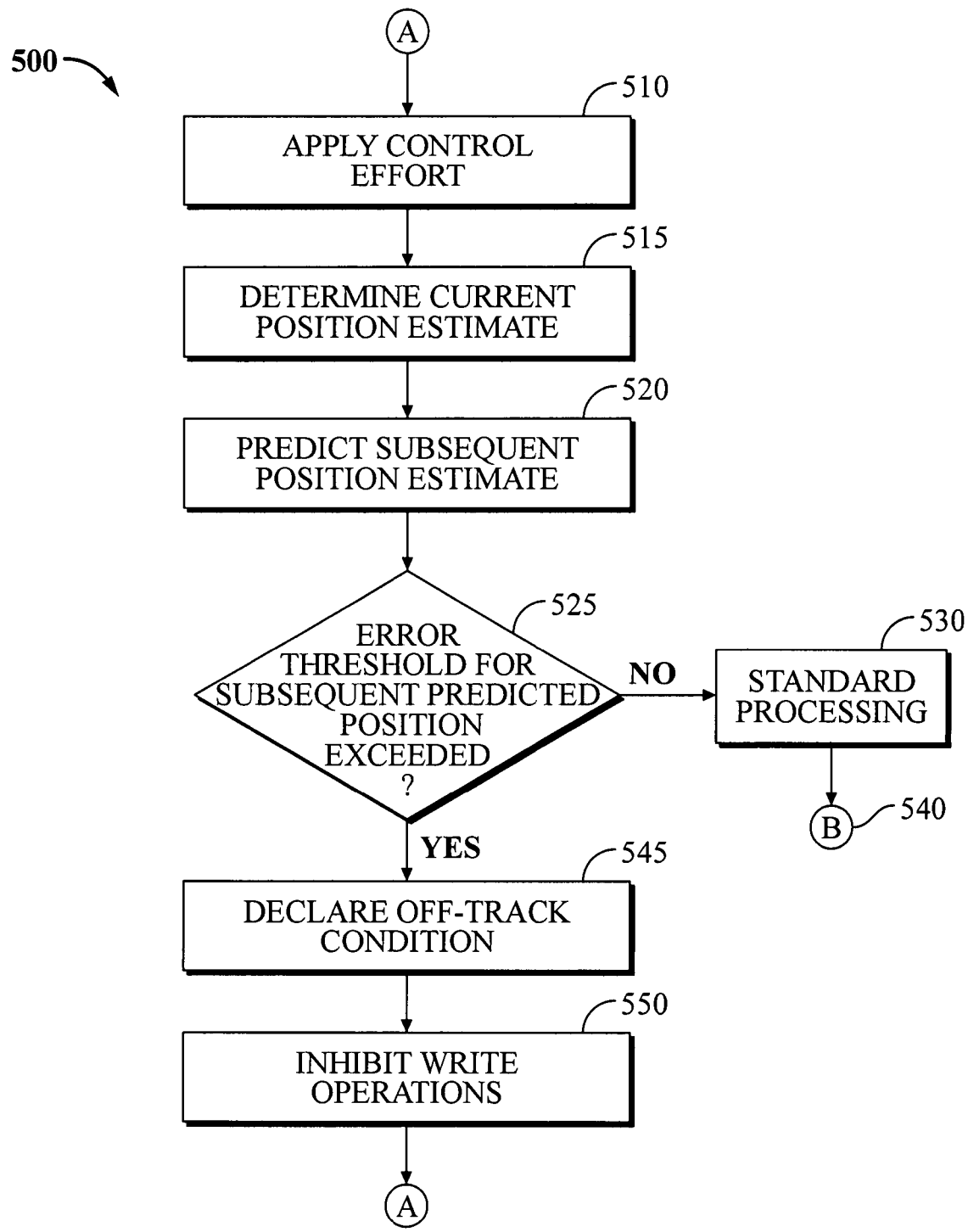
FIG. 5 is a flow diagram illustrating a recovery process utilizing the estimation filter, according to one embodiment of the present invention.

At circle A 450, process 400 ends and a standard settling and/or seeking control algorithm may be utilized before write operations resume again. However, in one embodiment, with reference to FIG. 5 a recovery process 500 utilizing the estimation filter may be utilized to determine if the head is predicted to return to an on-track condition such that write operations can be enabled.

In process 500, a control effort is applied by the servo controller to the actuator assembly in order to place the head into an on-track condition again. After the control effort, at block 515, the estimation filter determines a current position estimate and, at block 520, predicts a subsequent position estimate. If at decision block 525 it is determined that an error threshold for the subsequent predicted position estimate is exceeded, then at block 545, an off-track condition is declared and write operations are inhibited at block 550. In other words, the off-track condition continues and write operations continue to be inhibited. The process then moves to circle A again such that this process is iteratively cycled through.

On the other hand, if the error threshold for the subsequent predicted position estimate is not exceeded, then standard processing (block 530) occurs and at circle B 540 the process returns to block 420 of FIG. 4 in which normal read/write operations occur and track following operations occur in accordance with process 400, previously described.

By implementing the above-described process 400, and optionally process 500, as soon as off-track conditions are predicted, the write gate is toggled off such that error recovery can occur and data is not accidentally written to the wrong track.

FIG. 6 is a diagram illustrating one example of a type of estimation filter (e.g. a Kalman filter) that may be utilized with embodiments of the invention.

As can be seen, Kalman filter 600 is of typical Kalman filter form [e.g. $x_{k+1} = F_k * X_k + B_k * u_k$] wherein the predicted state or value $x_{k+1}$ is based upon a state characterization model $F_k$ applied to the previous state $x_k$ added with a control input model $B_k$ applied to a control state $u_k$.

In this particular embodiment, Kalman filter 600 is a predictive filter that assumes the current sample k corresponds to a servo wedge k currently being read and that the servo controller implementing Kalman filter 600 determines an estimate for the next servo wedge k+1. In particular, as can be seen by matrix 610, Kalman filter 600 predicts a subsequent position estimate [Pos_est(k+1)] of the moveable head relative to the track based upon a current position estimate [Pos_est(k)] and based upon state and control models 630 and 640, respectively, and control input 650.

Kalman filter 600 may also be used predict a subsequent velocity estimate [Vel_est(k+1)] of the moveable head relative to the track based upon a current velocity estimate [Vel_est(k)] and based upon state and control models 630 and 640, respectively, and control input 650. Further, Kalman filter 600 may also be used to predict a subsequent Bias estimate [Bias_est(k+1)] of the moveable head relative to the track based upon a current measured position [Pos_M(k)] and based upon state and control models 630 and 640, respectively, and control input 650 (including the current Bias estimate Bias_est(k)).

In this example, Kalman filter 600 includes state modeling coefficient matrix 630 ($A_{11}$, $A_{12}$, etc.) to model a state relationship of the moveable head relative to the track and also includes a control matrix 640 ($A_{13}$, $B_{11}$, etc.) including control model coefficients to model a control relationship of the moveable head relative to the track. State modeling coefficients correspond to pre-determined values that have been found to characterize the relationship of the state of the moveable head relative to the track. Control modeling coefficients correspond to pre-determined values that have been found to characterize the control relationship of the moveable head relative to the track.

As previously described, these state modeling coefficients and control modeling coefficients may be pre-determined and loaded into the Kalman estimation filter 600 at disk drive start-up. Further, these modeling coefficients may be individually modeled for a particular disk drive or generally modeled for a particular product class of disk drives and may be updated by the disk drive to provide a more optimized Kalman filter.

Control input matrix 650 is combined with the control modeling coefficients of control matrix 640 to represent the control imparted by the servo controller. The control inputs include a bias estimate (Bias_est(k)) representative of biases associated with the disk drive such as windage, vibration, and thermal effects and Notch1(k), Notch2(k), Notch3(k), Notch4(k) controls which are representative of a four part control input from the servo controller to the VCM driver to control the actuator assembly of the HDA.

It should be noted that the use of linear estimation filters, such as Kalman filters, are well known for use in control applications. Further, it should be appreciated by those of skill in this art that state modeling coefficients (e.g., $A_{11}, A_{12}$, etc.) for state matrix 630 and control modeling coefficients (e.g., $A_{13}, B_{11}$, etc.) for control matrix 640 in terms of position, velocity, and bias may be determined by well-known characterization techniques during the disk drive manufacturing and testing process for use in the above-described Kalman filter 600 during operation of the disk drive. Additionally, it should be appreciated by those of skill in this art that although a four part control effort based upon Notch filter inputs and a Bias input is described as an exemplary way to control the actuator assembly that other types of control methods may be utilized as well.

As can be seen, matrix 610 of Kalman estimation filter 600 provides predictive values for position, velocity, and bias, respectively, in terms of current determined estimates 620 as affected by current control inputs represented by matrix 650 including the use of state modeling coefficients 630 and control modeling coefficients 640.

Thus, Kalman filter 600 predicts a subsequent position estimate [Pos_est(k+1)] of the moveable head relative to the track based upon the current position estimate [Pos_est(k)]. Further, Kalman filter 600 predicts a subsequent velocity estimate [Vel_est(k+1)] of the moveable head relative to the track based upon the current velocity estimate [Vel_est(k)]. Additionally, Kalman filter 600 predicts a subsequent bias estimate [Bias_est(k+1)] of the moveable head relative to the track based upon the measured position [Pos_M(k)] and a current bias estimate Bias_est(k).

Utilizing the subsequent position estimate [Pos_est(k+1)] of the moveable head relative to the track, an error estimate can be determined by the equation:

$$\text{Error\_Estimate} = Pos\_est(k+1) - \text{target position}.$$

If the Error_Estimate exceeds a predetermined error threshold (Error_Thresh), then, as previously described, an off-track condition will be declared and write operations will be inhibited to prevent potentially having data being read from or written to a wrong track causing disk drive errors.

Utilizing this methodology a current position estimate may be determined for a first servo sector and a subsequent position estimate may be predicted for a second servo sector directly following the first servo sector such that off-track conditions can be determined within one servo sector. Additionally, it should be appreciated that, instead of utilizing position estimates to determine off-track conditions, velocity and bias estimates may be utilized to determine off-track conditions.

It should be appreciated that by using the above-described Kalman estimation filter whether a subsequent predicted position estimate exceeds an error threshold may be determined in rapid fashion (within one servo sector) such that an off-track condition may be rapidly declared and write operations inhibited such that data is not incorrectly read from a wrong track or written to a wrong track thereby avoiding disk drive errors.

The techniques previously described can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media.

What is claimed is:

1. A disk drive comprising:
   a moveable head;
   a disk having a plurality of tracks; and
   a servo controller to control track following operations with the moveable head, a substantial majority of the tracks having a plurality of servo sectors utilized in track following operations, the servo controller to implement an estimation filter including operations comprising:
      determining a current position estimate of the moveable head relative to a track;
      predicting a subsequent position estimate of the moveable head relative to the track based upon the current position estimate; and
      determining whether the predicted subsequent position exceeds an error threshold; wherein the estimation filter comprises a Kalman filter and the Kalman filter includes state modeling coefficients to model a relationship of the moveable head relative to the track and control modeling coefficients to model a control relationship of the moveable head relative to the track.

2. The disk drive of claim 1, wherein the servo controller to implement an estimation filter includes operations further comprising inhibiting write operations by the moveable head if the predicted subsequent position exceeds the error threshold.

3. The disk drive of claim 1, wherein the current position estimate is determined for a first servo sector and the subsequent position estimate is predicted for a second servo sector directly following the first servo sector.

4. The disk drive of claim 1, wherein the estimation filter further:
   determines a current velocity estimate of the moveable head relative to a track; and
   predicts a subsequent velocity estimate of the moveable head relative to the track based upon the current velocity estimate.

5. The disk drive of claim 1, wherein the estimation filter further:
   determines a current bias estimate of the moveable head relative to the track; and
   predicts a subsequent bias estimate of the moveable head relative to the track based upon the current bias estimate.

6. The disk drive of claim 5, wherein bias is imparted by at least one of windage and thermal effects.

7. The disk drive of claim 1, further comprising a preamplifier including a write gate coupled to the moveable head, the write gate being toggled off to inhibit write operations of the moveable head.

8. A method for performing track following operations in a disk drive comprising:
   moving a head relative to a disk having a plurality of tracks, a substantial majority of the tracks having a plurality of servo sectors utilized in track following operations;

controlling track following operations with the moveable head; and implementing an estimation filter to:
- determine a current position estimate of the moveable head relative to a track;
- predict a subsequent position estimate of the moveable head relative to the track based upon the current position estimate; and
- determine whether the predicted subsequent position exceeds a threshold; wherein the estimation filter comprises a Kalman filter and the Kalman filter includes state modeling coefficients to model a relationship of the moveable head relative to the track and control modeling coefficients to model a control relationship of the moveable head relative to the track.

9. The method of claim 8, further comprising inhibiting write operations of the moveable head if the predicted subsequent position exceeds the error threshold.

10. The method of claim 8, wherein the current position estimate is determined for a first servo sector and the subsequent position estimate is predicted for a second servo sector directly following the first servo sector.

11. The method of claim 8, wherein the estimation filter further:
- determines a current velocity estimate of the moveable head relative to the track; and
- predicts a subsequent velocity estimate of the moveable head relative to the track based upon the current velocity estimate.

12. The method of claim 8, wherein the estimation filter further:
- determines a current bias estimate of the moveable head relative to the track; and
- predicts a subsequent bias estimate of the moveable head relative to the track based upon the current bias estimate.

13. A disk drive comprising:
a moveable head;
a disk having a plurality of tracks;
means for controlling track following operations with the moveable head, a substantial majority of the tracks having a plurality of servo sectors utilized in track following operations;
means for determining a current position estimate of the moveable head relative to a track;
means for predicting a subsequent position estimate of the moveable head relative to the track based upon the current position estimate;
means for determining whether the predicted subsequent position exceeds an error threshold;
means for utilizing state modeling coefficients to model a relationship of the moveable head relative to the track; and
means for utilizing control modeling coefficients to model a control relationship of the moveable head relative to the track.

14. The disk drive of claim 13, further comprising means for inhibiting write operations by the moveable head.

15. The disk drive of claim 13, wherein the current position estimate is determined for a first servo sector and the subsequent position estimate is predicted for a second servo sector directly following the first servo sector.

16. The disk drive of claim 13, further comprising means for:
- determining a current velocity estimate of the moveable head relative to a track; and
- predicting a subsequent velocity estimate of the moveable head relative to the track based upon the current velocity estimate.

17. The disk drive of claim 13, further comprising means for:
- determining a current bias estimate of the moveable head relative to the track; and
- predicting a subsequent bias estimate of the moveable head relative to the track based upon the current bias estimate.

18. The disk drive of claim 17, wherein bias is imparted by at least one of windage and thermal effects.

* * * * *